United States Patent
Smith

(10) Patent No.: US 7,862,066 B2
(45) Date of Patent: Jan. 4, 2011

(54) 3 WAY ATV/UTV TRACTOR RECEIVER HITCH

(75) Inventor: Douglas R. Smith, Fair Oaks, CA (US)

(73) Assignee: Big Roc Tools, Inc., Arcadia, CA (US)

(*) Notice: Subject to any disclaimer, the term of this patent is extended or adjusted under 35 U.S.C. 154(b) by 164 days.

(21) Appl. No.: 12/321,887

(22) Filed: Jan. 27, 2009

(65) Prior Publication Data

US 2009/0189368 A1  Jul. 30, 2009

Related U.S. Application Data

(60) Provisional application No. 61/062,594, filed on Jan. 28, 2008.

(51) Int. Cl.
*B60D 1/07* (2006.01)

(52) U.S. Cl. .................. 280/416.1; 280/416.2

(58) Field of Classification Search .............. 280/416.1, 280/416.2
See application file for complete search history.

(56) References Cited

U.S. PATENT DOCUMENTS

| | | | | | |
|---|---|---|---|---|---|
| 2,827,307 | A | * | 3/1958 | Osborn | 280/416.3 |
| 5,106,114 | A | * | 4/1992 | Haupt | 280/416.1 |
| 5,265,899 | A | * | 11/1993 | Harrison | 280/416.1 |
| 5,725,229 | A | * | 3/1998 | McWethy | 280/416.1 |
| 5,873,594 | A | * | 2/1999 | McCoy et al. | 280/491.5 |
| 7,055,845 | B1 | * | 6/2006 | Putnam | 280/504 |
| 7,264,261 | B2 | * | 9/2007 | Konsela | 280/507 |
| 2004/0080140 | A1 | * | 4/2004 | Hart | 280/416.1 |
| 2005/0006874 | A1 | * | 1/2005 | Mrofka et al. | 280/416.1 |
| 2005/0067812 | A1 | * | 3/2005 | Moss et al. | 280/416.1 |
| 2007/0228693 | A1 | * | 10/2007 | Witchey | 280/416.1 |
| 2009/0127820 | A1 | * | 5/2009 | Konsela | 280/416.1 |

* cited by examiner

*Primary Examiner*—Lesley Morris
*Assistant Examiner*—Tashiana Adams
(74) *Attorney, Agent, or Firm*—Karl F. Milde, Jr.; Eckert Seamans Cherin & Mellott, LLC

(57) ABSTRACT

A three-way hitch assembly for a tractor-type vehicle, such as an ATV/UTV, is designed to facilitate the attachment of multiple accessory devices to the vehicle. The hitch assembly includes: a drawbar pintle, a hook, and a replaceable hitch ball.

6 Claims, 1 Drawing Sheet

3 WAY ATV/UTV TRACTOR RECEIVER HITCH

CROSS-REFERENCE TO RELATED APPLICATION

This present application claims benefit of priority from U.S. Provisional Application Ser. No. 61/062,594, filed Jan. 28, 2008, entitled "3 WAY ATV/UTV TRACTOR RECEIVER HITCH".

BACKGROUND OF THE INVENTION

The present invention relates generally to a trailer hitch assembly and more particularly to an all-terrain vehicle (ATV)/utility vehicle (UTV) hitch assembly with multiple connection modes.

ATV/UTV tractors equipped with a trailer are commonly used in hunting, farming, landscaping, gardening and the like. Agricultural implements with pintle, chain, or strap attachments are available for use with such utility vehicles.

Although some all-terrain vehicle (ATV) manufacturers have begun installing hitch receivers, as opposed to hitch bars, on their ATVs, no standard has been agreed upon thus, depending on the accessory, the attachment can vary.

Hitch bar mounted accessories are generally not quickly attached or detached. They are generally bolted to the mount hole and require the use of tools for installation and removal.

As can easily be recognized by one skilled in the art, hitch assemblies, attachments, accessories and implements for ATVs and lawn and garden tractors need to be adaptable for the different attachment modes. Thus, a 3 way hitch assembly solving the aforementioned problems is desired.

SUMMARY OF THE INVENTION

The principal object of the present invention is to provide a 3 way hitch that can be used for attaching multiple accessory devices to an ATV/UTV and/or other utility vehicle.

This object, as well as other objects which will become apparent from the discussion that follows are achieved, according to the present invention, by providing a hitch assembly that includes:

1. A receiver portion that can be attached to a vehicle which is not equipped with a factory-installed receiver;
2. A drawbar that is usable with a provided receiver or factory installed receiver;
3. A drawbar that can be quickly attached or removed as needed;
4. A drawbar that can be rotated in the receiver to gain access to the hitching system required for the current application;
5. A hook on one side of the drawbar for use with tow chain or straps;
6. A pintle on one side of the drawbar for use with pin/pintle attachment accessories;
7. A trailer ball on one side of the drawbar for use with trailer hitch mounts; and finally
8. To provide extra extension from the mounting point for the drawbar and the receiver, by extending the hitching location further out from the normal attachment point thus adding rear tire clearance and safety when turning.

For a full understanding of the present invention, reference should now be made to the following detailed description of the preferred embodiments of the invention as illustrated in the accompanying drawing.

BRIEF DESCRIPTION OF THE DRAWING

The single FIGURE (FIG. 1) is an assembly diagram, in perspective, showing the various elements of the hitch assembly according to the present invention.

DETAILED DESCRIPTION OF THE PREFERRED EMBODIMENT

Figure 1:
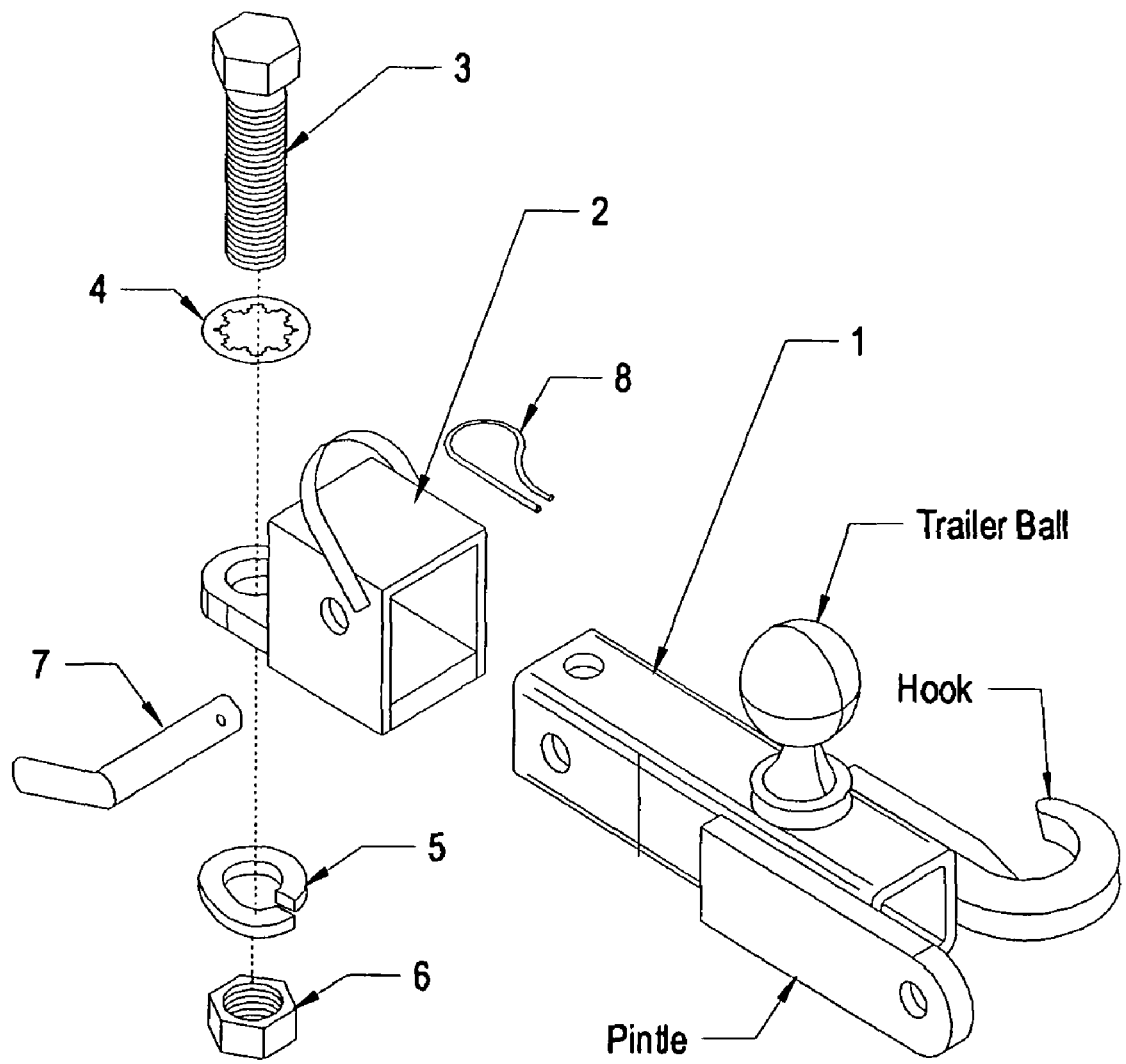

As shown in FIG. 1, the hitch assembly according to the invention comprises a drawbar (1) with hook, pintle, and trailer ball; a receiver (2); mounting hardware (3, 4, 5, 6) and a hitch pin (7, 8).

In typical use, the receiver (2) is attached to the mounting hole on the ATV or utility vehicle with mounting hardware (3, 4, 5, 6) if no receiver is currently installed. The drawbar (1) is inserted into the receiver depending upon which attachment mode is needed. Then the drawbar is held into receiver by hitch pin (7). For other attachment needs, the hitch pin (7) is removed and the drawbar (1) removed and reinserted to allow for the proper attachment.

The drawbar (1) includes a relatively long extension portion from the mounting point to the trailer ball to extend the hitching location further out from the normal attachment point to add rear tire clearance and safety when turning the vehicle.

There has thus been shown and described a novel 3 way ATV/UTV tractor receiver hitch which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A three-way hitch assembly for a motor vehicle, said assembly comprising, in combination:
    (a) a receiver portion adapted to be attached to a rear of said vehicle, said receiver portion having a square opening for receiving a drawbar portion;
    (b) a drawbar portion comprising an elongate rod with an external square profile matching the square opening in said receiver portion, said drawbar portion having (1) a free end and (2) a connecting end, said rod with said square profile extending from one said end to the other, said connecting end being adapted to be inserted in the receiver portion in one of a plurality of four orientations as required for a particular application;
    (c) means for retaining the connecting end of the drawbar portion in the receiver portion in said one of said plurality of orientations;
    (d) a hook attached to a first side of the drawbar portion and adapted to receive a tow chain or strap, said hook extending outward from said free end of said drawbar portion in a longitudinal direction of said rod;
    (e) a drawbar pintle attached to a second side of the drawbar portion, opposite said first side, having a hole adjacent one end adapted to receive a pin for attachment of an accessory, said pintle with said hole extending outward from said free end of said drawbar portion in said longitudinal direction of said rod; and
    (f) a trailer hitch ball attached to a third, remaining side of the drawbar portion adjacent said free end and adapted to receive a trailer hitch ball mount.

2. A three-way hitch assembly for a motor vehicle, said assembly comprising, in combination:
   (a) a drawbar portion comprising an elongate rod with an external square profile, said drawbar portion having (1) a free end and (2) a connecting end, said rod with said square profile extending from one said end to the other, said connecting end being adapted to be inserted in a matching square opening in a receiver portion attached to a rear of said vehicle in one of a plurality of four orientations as required for a particular application;
   (b) means for retaining the connecting end of the drawbar portion in the square opening of the receiver portion, the drawbar portion being insertable in said opening in one of said plurality of orientations;
   (c) a hook attached to a first side of the drawbar portion adapted to receive a tow chain or strap, said hook extending outward from said free end of said drawbar portion in a longitudinal direction of said rod;
   (d) a pintle attached to a second side of the drawbar portion, opposite said first side, having a hole adjacent one end adapted to receive a pin for attachment of an accessory, said pintle with said hole extending outward from said free end of said drawbar portion in said longitudinal direction of said rod; and
   (e) an opening on a third, remaining side of the drawbar portion adapted to receive a trailer hitch ball.

3. The three-way hitch assembly defined in claim 1, wherein said rod is hollow from end to end, thereby to facilitate bolting on the trailer hitch ball.

4. The three-way hitch assembly defined in claim 1, wherein said pintle is a elongate, straight, flat bar of rectangular profile.

5. The three-way hitch assembly defined in claim 2, wherein said rod is hollow from end to end, thereby to facilitate bolting on the trailer hitch ball.

6. The three-way hitch assembly defined in claim 2, wherein said pintle is a elongate, straight, flat bar of rectangular profile.

* * * * *